United States Patent [19]

Farr et al.

[11] 4,293,583

[45] Oct. 6, 1981

[54] PROCESS FOR DEBITTERING A PROTEIN HYDROLYSATE AND THE DEBITTERED HYDROLYSATE OBTAINED BY THIS PROCESS

[75] Inventors: David R. Farr, Brent; Danièle Magnolato, Chardonne, both of Switzerland

[73] Assignee: Societe d'Assistance Technique pour Produits Nestle S.A., Lausanne, Switzerland

[21] Appl. No.: 114,680

[22] Filed: Jan. 23, 1980

[30] Foreign Application Priority Data

Jan. 26, 1979 [CH] Switzerland .......................... 788/79

[51] Int. Cl.$^3$ .............................................. A23J 3/00
[52] U.S. Cl. ................................... 426/657; 426/422; 426/41
[58] Field of Search ............... 426/656, 657, 422, 423, 426/427, 41

[56] References Cited

U.S. PATENT DOCUMENTS

| 1,448,281 | 3/1923 | Rewald | 426/423 X |
| 2,149,306 | 3/1939 | Millar | 426/422 X |
| 2,566,477 | 9/1951 | Abrahamczik et al. | 426/41 |
| 3,857,966 | 12/1974 | Feldman et al. | 426/41 X |
| 4,097,614 | 6/1978 | West | 426/423 X |
| 4,160,042 | 7/1979 | Farr et al. | 426/427 X |

Primary Examiner—Robert A. Yoncoskie
Attorney, Agent, or Firm—Watson, Leavenworth, Kelton & Taggart

[57] ABSTRACT

The invention relates to the treatment of protein hydrolysates with a view to reducing their content of bitter substances.

This process comprises contacting the hydrolysate with a solid ligneous adsorbent of vegetable origin, for example based on carob, and collecting the debittered hydrolysate after separation from the adsorbent.

7 Claims, No Drawings

PROCESS FOR DEBITTERING A PROTEIN HYDROLYSATE AND THE DEBITTERED HYDROLYSATE OBTAINED BY THIS PROCESS

This invention relates to the treatment of protein hydrolysates with a view to reducing their content of bitter substances.

In general, protein hydrolysates are mixtures of amino acids and small peptides which are capable of supplying the organism with the constituent elements of the proteins in a directly assimilable form. As a result, they represent products of high nutritional value but are attended by the disadvantage that they often have an unpleasant odour and a bitter taste which limit their field of application.

Although various debittering techniques are already known, their use would appear to be rather academic or at least limited to products of high added value either because they show poor selectivity (treatment with solvents) or because they are onerous (adsorption on resins or gels).

The present invention does not have any of these disadvantages. It relates to a process for debittering a protein hydrolysate by selective adsorption using a natural and inexpensive material. The process according to the invention is characterized in that the hydrolysate is brought into contact with a solid ligneous adsorbent of vegetable origin in divided form, hereinafter referred to as the "adsorbent", and in that the hydrolysate thus debittered is collected after separation from the adsorbent.

In the context of the invention, protein hydrolysates are understood to be the products obtained by the enzymatic or chemical hydrolysis of animal or vegetable proteins. The starting proteins may be actual animal proteins, such as meat proteins, fish proteins, etc., or proteins of lactic origin, casein, lactalbumin, etc. The proteins may be vegetable proteins from seeds or leaves, for example soya proteins, or even proteins of microbial origin, such as yeast proteins.

These proteins are subjected either to chemical, generally acid, hydrolysis or to enzymatic hydrolysis either with mixtures of enzymes or with purified enzymes. In the case of microbial proteins, the enzymes used may be their own enzymes, in which case the products obtained are called autolysates.

Examples of protein hydrolysates advantageously treated in accordance with the invention are the enzymatic hydrolysates of lactalbumin. These products are prepared from lactalbumin obtained for example by the ultrafiltration of whey and then hydrolysed with enzymes or with mixtures of enzymes, such as pancreatin, or with purified proteases, such as trypsin.

The hydrolysates obtained contain free amino acids and short and medium chain peptides.

As mentioned above, the hydrolysate obtained has the disadvantage of a cerain bitterness which is probably due to the amino acids of aromatic character, such as phenyl alanine, tyrosine, tryptophane, and to the peptides containing residues of these amino acids. The process according to the invention enables the bitterness of these products to be greatly reduced by adsorption of these bitter principles, thereby broadening their field of application.

The solid ligneous adsorbent of vegetable origin which may be used in the process according to the invention may differ widely in nature. It may be formed for example by solid fibrous particles obtained by the coarse grinding of parts of vegetables having the nature of wood, such as the pulps, hulls, shells, husks of fruits or leguminosae or the barks. One particularly suitable and abundantly available material is formed by the fibrous residues emanating from carob husks from which the sugars have been extracted with hot water. The carob or locust tree, *Ceratonia siliqua* (family of leguminosae) is a tree capable of growing to a height of 20 meters which originated in Syria and which is now grown in the Mediterranean countries. Its fruit contains seeds of which the endosperm is the source of carob gum. The pericarp or husk is either discarded or used to produce a low-quality syrup (carob syrup) or even in the feeding of animals. The residues are normally discarded.

Thus, the starting material used for producing the adsorbent is formed either by husks or by residues emanating from extraction of the sugars. Accordingly, it is advantageous to treat this material by any suitable method in order to remove the impurities, the sugars and the aromas of carob therefrom. Normally the material is subjected to coarse grinding. In cases where the non-desugared husks are treated, a convenient method is to cool them for example to $-40°$ C. and then to grind them. The particles of carob husks or partially desugared residues are treated with hot water in order to eliminate the sugars. It is possible to use for example a battery of in-line extraction cells and to extract the sugars with hot water, for example at 95° C. The carob particles are then advantageously dried, for example in a light vacuum, which enables them to be deodorised.

In one advantageous variant, these particles may be treated with an acid and then optionally subjected to a deodorising treatment, for example by stripping with steam. In the first case, it is possible to use any suitable acid, such as for example hydrochloric, sulphuric or phosphoric acid in dilute or concentrated form. A treatment with dilute hydrochloric acid for 1 to 3 hours at ambient temperature is suitable.

For practical reasons, it is preferred to use a material having a fairly regular particle size. Accordingly, the material is sieved, the particles retained advantageously ranging from 0.3 to 5 mm and preferably from 0.5 to 4 mm in diameter.

The protein hydrolysate and the adsorbent may be brought into contact in various ways. For example, the hydrolysate may be percolated through a column of adsorbent, in which case the debittered hydrolysate is directly recovered at the foot of the column. It is also possible to suspend the adsorbent in the hydrolysate, in which case it is necessary to provide separation means, separation being obtained very simply by siphoning after decantation or by filtration.

The period of contact between the adsorbent and the protein hydrolysate and various other parameters, such as the contact temperature and the proportions of adsorbent in relation to the hydrolysate, depend both upon the required level of debittering and upon the methods adopted. In general, contact times of the order of 5 to 60 minutes for temperatures in the range from 10° to 60° C. are satisfactory. It is of advantage to use hydrolysate/adsorbent proportions of from 10 to 400 ml/g. Adsorption may be followed by rinsing with water at the same temperature or at a higher temperature providing it does not exceed 60° C.

For its part, the protein hydrolysate may contain after clarification from 1 to 25% and preferably from 5 to 10% by weight of soluble material. This hydrolysate may have been deodorised beforehand by stripping with steam.

In a first embodiment of the process according to the invention, desugared carob husks in particulate form which have advantageously been washed with acid are suspended in a protein hydrolysate previously clarified and optionally standardised by dilution with water and having a dry matter content of the order of 3 to 15%. After a time interval of from 10 to 60 minutes, during which the suspension is continuously stirred, the solids are separated from the liquid by filtration and the debittered hydrolysate is thus recovered.

In a variant, the carob husks are resuspended in water for rinsing purposes and, after separation, the rinsing waters are added to the debittered extract. Under these conditions, adsorption may be carried our for example at ambient temperature whilst rinsing is carried out at around 50° C. It has been found that washing, particularly with hot water, desorbs certain bitter amino acids and peptides. It is obviously preferred not to introduce them into the hydrolysate because, in that case, their bitterness would have to be masked, for example by the addition of flavouring. Accordingly, it is necessary to seek a compromise which ensures a minimum loss of dry matter for an acceptable bitterness. The mixture obtained is then treated by the methods normally used in the field of protein hydrolysates. If desired, it is possible to re-introduce into the hydrolysate the solid materials, if any, from which it was freed before contact with the adsorbent in order to obtain a final hydrolysate characterised by cloudiness.

In a second preferred embodiment, beds of particles of desugared carob husks arranged in columns are used and the protein hydrolysate is percolated through these columns. The debittered hydrolysate is thus directly recovered. The particles used have to be fairly coarse, otherwise the columns would quickly become blocked. Rinsing may be carried out in the same way as before.

The quantity of the hydrolysates obtained does not suffer as a result of the treatment according to the invention. On the contrary, in the opinion of tasters with a preference for non-bitter hydrolysates, the treatment has a distinctly beneficial effect.

In particular, the hydrolysates of lactalbumin treated in accordance with the invention may be incorporated in numerous dietetic preparations such as, for example, dietetic milks or readily resorbable foods intended for people suffering from digestion problems.

These hydrolysates may of course be dried by spray-drying or freeze-drying.

The process according to the invention is illustrated by the following Examples in which the parts and percentages quoted are by weight unless otherwise indicated.

EXAMPLE 1

Preparation of the adsorbent 10 kg of residues of carob husks emanating from extraction of the sugars are ground to a particle size of less than 2 mm. This batch is introduced into a tank containing 50 kg of deionised water at 60° C., followed by stirring for 30 minutes at the same temperature.

After separation, the solids are stirred for 30 minutes with 50 kg of deionised water at 20° to 60° C. and separated. 25 liters of 2 N hydrochloric acid are then added, followed by stirring for 2 to 3 hours at 20° C. The solids are separated and washed with deionised water until the washing waters are colourless. The solids are then separated again and deodorised by stripping with steam in a light vacuum (50 mmHg, 100° C.) for 2 to 3 hours. After separation, the carob particles are dried and sieved through a 0.3 mm mesh sieve. Particles having a diameter of from 0.3 to 2 mm are thus collected.

In the above treatment, sulphuric acid or phosphoric acid (2 N) may be used instead of hydrochloric acid with similar results.

Preparation of hydrolysate A

A protein hydrolysate is prepared as follows using pancreatin:

A whey protein in the form of an approximately 10% suspension in water of which the pH has been adjusted to approximately 7.2 by the addition of potassium hydroxide is treated for 5 hours at 55° C. with a commercial pancreatin in a quantity of 3% based on protein (containing—in active form—trypsin, chymotrypsin, peptidases, amylases and lipases).

On completion of hydrolysis, the hydrolysate is heat-treated for 30 to 50 seconds at 105° C., after which it is centrifuged, filtered, pasteurised at 105° C. and then evaporated and dried by spray-drying. The product has the following composition:

nitrogen content: 11.8
moisture: 3.6
ash: 4
lactose: 8.7
pH (5% solution): 6.2 and contains approximately 27% of free amino acids.

Treatment of the hydrolysate 100 ml. of a 5% solution of hydrolysate A are passed through a column containing 10 g of adsorbent.

The eluate contains 49% of the dry starting material; its bitter taste is greatly reduced. The chromatographic profile of this eluate indicates that the peptides having a molecular weight below 1000 and containing aromatic amino acids (phenyl alanine, tyrosine, tryptophane) are retained to a considerable extent. Adsorption of the high molecular weight peptides is also observed.

Washing with 100 ml. of water at ambient temperature enables the peptides and amino acids containing tyrosine and tryptophane to be eluated. 23% of the dry starting material are recovered.

This initial wash is followed by washing with 100 ml. of water of 50° C. and then with 100 ml. of water at 90° C. These hot washes enable 15% of the dry starting material, essentially containing phenyl alanine (peptides), to be recovered.

The 13% of dry matter remaining in the column consist essentially of peptides of high molecular weight. The adsorbent is regenerated by prolonged washing in boiling water, if necessary after the strongly fixed compounds have been desorbed by means of a detergent (or by any standard method).

The results are set out in Table I below:

TABLE 1

| Sample | Weight of hydrolysate (g) | Weight of adsorbent (g) | Volume of hydrolysate (ml) | % recovered | Tasting |
|---|---|---|---|---|---|
| Hydrolysate A | 5.00 | 10.0 | 100 | | I 100% |
| Eluate | 2.45 | — | 100 | 49 | I 33% II 33% III 33% |
| Washing 25° C. | 1.15 | — | 100 | 23 | I 50% II 33% III 17% |
| Washing 50° C. | 0.45 | — | 100 | 9 | I 17% II 50% III 33% |
| Washing 90° C. | 0.30 | — | 100 | 6 | I 0% II 50% III 0% |

Remarks

I: sample regarded as bitter by the tasters
II: sample regarded as moderately bitter by the tasters
III: sample regarded as not bitter by the tasters

EXAMPLE 2

The adsorbent is prepared in the same way as in Example 1 and the column treatment is carried out in the same way as in Example 1.

Preparation of hydrolysate B

Hydrolysate B is prepared in the same way as hydrolysate A except that incubation with pancreatin is carried out for 2 hours and a mixture of purified commercial trypsins is then added, after which incubation is continued for 3 hours.

After spray-drying, the product has the following composition:
nitrogen content: 11.8
moisture: 3.4
ash: 5.3
lactose: 7.4
pH (5% solution): 6.6
and contains from 18 to 20% of free amino acids.

The results are set out in Table II below:

TABLE II

| Sample | Weight of hydrolysate (g) | Weight of adsorbent (g) | Volume of hydrolysate (ml) | % recovered |
|---|---|---|---|---|
| Hydrolysate B | 5.00 | 10.0 | 100 | — |
| Eluate | 2.25 | — | 100 | 45 |
| Washing 25° C. | 0.95 | — | 100 | 19 |
| Washing 50° C. | 0.60 | — | 100 | 12 |
| Washing 90° C. | 0.35 | — | 100 | 7 |

EXAMPLES 3 to 4

5 ml. of a 5% solution of hydrolysate A prepared in accordance with Example 1 are contacted with 100, 200 or 500 mg of adsorbent with stirring at ambient temperature. The adsorption of the aromatic compounds as a function of time is followed for the first hour of reaction and the quantity of dissolved solids adsorbed after a reaction time of one hour is determined.

The adsorbent is then washed with 5 ml. of water at ambient temperature for 15 minutes and the quantity of solids recovered by washing and the proportion of aromatic compounds recovered are determined.

5 ml. of a 5% solution of hydrolysate B prepared in accordance with Example 2 are treated in the same way.

The results obtained are set out in Table III below:

TABLE III

| Sample | Weight of hydrolysate (mg) | Weight of adsorbent (mg) | Volume of hydrolysate (ml) | % Recovered Hydrolysate solution | % Recovered Washing waters |
|---|---|---|---|---|---|
| Starting hydrolysate A | 212.5 | — | 5.0 | — | — |
| Treated hydrolysate A | | 100 | 5.0 | 97 | 2 |
| Treated hydrolysate A | | 200 | 5.0 | 90 | 5 |
| Treated hydrolysate A | | 500 | 5.0 | 80 | 9 |
| Starting hydrolysate B | 213.7 | — | 5.0 | — | — |
| Treated hydrolysate B | | 100 | 5.0 | 95 | 3 |
| Treated hydrolysate B | | 200 | 5.0 | 88 | 3 |
| Treated hydrolysate B | | 500 | 5.0 | 71 | 7 |

We claim:

1. A process for debittering an enzymatic hydrolysate of whey protein which comprises contacting the hydrolysate with an adsorbent consisting of desugared carob particles at a temperature of from 10° to 60° C.

2. A process as claimed in claim 1, wherein the adsorbent is pretreated by washing with acid and/or stripping with steam.

3. A process as claimed in claim 1, wherein the particles of adsorbent have diameters of from 0.3 to 5 mm.

4. A process as claimed in claim 1, wherein the hydrolysate is contacted with the adsorbent for 5 to 60 minutes.

5. A process as claimed in claim 1, wherein the hydrolysate and the adsorbent are contacted in hydrolysate/adsorbent proportions of from 10 to 400 ml. per gram.

6. A process as claimed in claim 1, wherein the adsorbent is suspended in the protein hydrolysate.

7. A process as claimed in claim 1, wherein the protein hydrolysate is percolated through a column filled with adsorbent.

* * * * *

UNITED STATES PATENT AND TRADEMARK OFFICE
CERTIFICATE OF CORRECTION

PATENT NO. : 4,293,583
DATED : October 6, 1981
INVENTOR(S) : David R. Farr and Daniele Magnolato It is certified that error appears in the above—identified patent and that said Letters Patent is hereby corrected as shown below:

Column 1, line 13, "v lue" should read --value--.

Column 1, line 58, "cerain" should read --certain--.

Column 3, line 43, "quantity" should read --quality--.

Signed and Sealed this

Twenty-ninth Day of December 1981

[SEAL]

Attest:

GERALD J. MOSSINGHOFF

Attesting Officer

Commissioner of Patents and Trademarks